Patented July 15, 1947

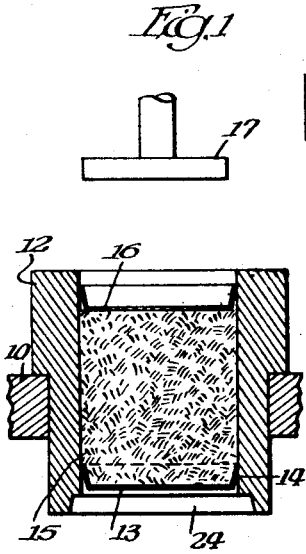
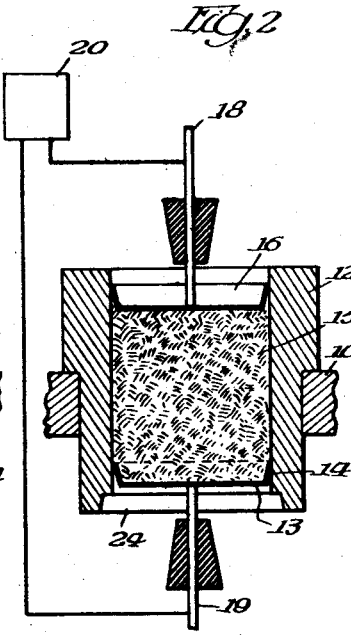
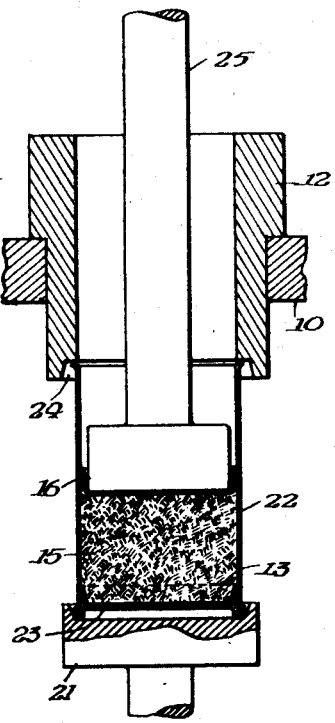
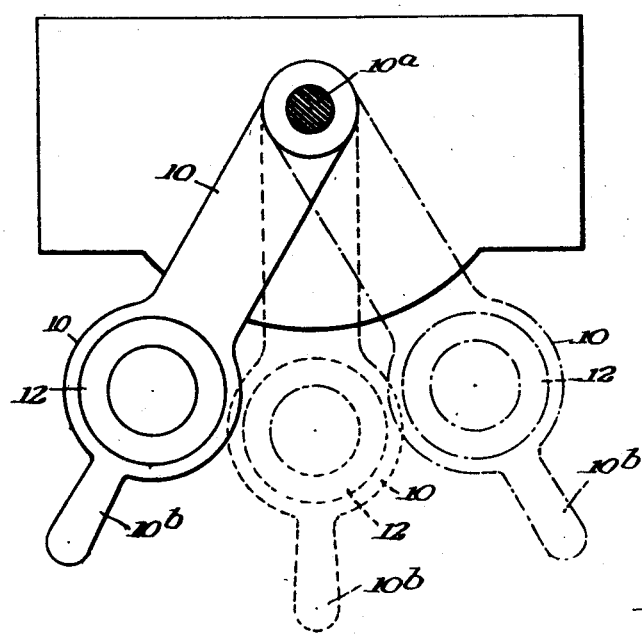
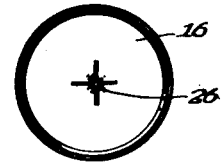
Inventor
George W. Wacker

2,423,915

UNITED STATES PATENT OFFICE 2,423,915

METHOD FOR HEATING AND PACKAGING THERMOPLASTIC MOLDING MATERIAL

George W. Wacker, Chicago, Ill., assignor to Clearing Machine Corporation, Chicago, Ill., a corporation of Illinois Application May 31, 1943, Serial No. 489,118

1 Claim. (Cl. 18—48)

This invention relates to an improved method of heating and packaging thermoplastic molding material which is to be immediately used, or shortly after it is assembled, as an original package and before the temperature of the material is reduced sufficiently to affect the viscosity of the material.

One of the objects of the invention is to provide an improved method of this character whereby a predetermined quantity of the material is first deposited into and confined within a non-conducting receiver, and thereafter subjected to the action of high frequency current to heat and plasticize the same in an electrostatic field. The material is thus subjected to the action of the high frequency current until it becomes viscous, and then the entire charge thus heated is transferred, in its heated condition, into a packaging container, without the loss of any of the material or of the gases which are generated or created as a result of the heating operation.

Another object of the invention is to provide an improved method of this character, whereby a quantity of moldable material is deposited within a non-conducting receiver, and thereafter subjected to the action of high frequency current, to heat the material in an electrostatic field and after it has attained the desired degree of plasticity, to be transferred into a pressure chamber and subsequently injected into a mold.

To the attainment of these ends and the accomplishment of other new and useful objects and results as will appear, the invention consists in substantially the steps of operation in carrying out this improved method, whereby such results may be accomplished. Any suitable apparatus adapted for the purpose may be employed, but in the drawing there is diagrammatically illustrated a portion of an apparatus or machine well adapted for this purpose.

In the drawing,

Fig. 1 is a detail sectional view of one of the receivers and a portion of the support therefor, showing the material in the receiver and the closure elements in position.

Fig. 2 is a view similar to Fig. 1, showing the terminals of an electric current of high frequency connected with the closure elements.

Figure 3 is a detail view, partly in elevation and partly in section, showing the manner of ejecting the charge with the closure elements, into a container for packaging the material.

Fig. 4 is a diagrammatic plan view of a simplified support for the receiver, showing in dotted lines the support in several positions for carrying out this improved method.

Fig. 5 is a detail plan view of one of the closures, showing the weakened portions therein.

In the drawing, the numeral 10 designates a support which is mounted, as at 10$^a$, to swing about a pivot, and which is provided with an operating handle 10$^b$, by means of which handle intermittent steps of advancement may be given thereto to cause the support to assume positions in which it will dwell, at different points or stations.

Carried by the support is a chamber or receiver 12 which is open at both its top and bottom, and is constructed of glass, porcelain, or any other suitable non-conducting material.

In carrying out this improved method, the support 10 is actuated so as to position the receiver 12 at the filling or loading station (Fig. 1), where a charge of material 15 to be plasticized is placed therein. This may be accomplished in any suitable manner.

Before placing the material into the receiver 12, a closure element 13 is placed into or against the receiver to form the bottom thereof, and this closure is preferably constructed of resilient material, such as metal, to form an upstanding circumferential flange 14, which, being also resilient, will engage and frictionally bind against the wall of the receiver. The closure element 13 may be placed in position in any suitable manner, such as by means of a plunger 17. The material 15, such as cellulose acetate, butyrate, or any other suitable material to be plasticized, is then deposited into the receiver. This material may be in a solid or granular form, and after a predetermined quantity has been deposited therein, another closure element 16, preferably of the same material and shape as the closure 13, is placed in a position to form a closure for the top of the receiver. This closure 16 also is preferably frictionally secured in position.

The closures 13 and 16 are, however, constructed of some suitable electrical conducting material, and the upper closure may also be positioned by means of the plunger 17, which plunger may also act to compact the material by pressure upon the closure 16. The filled and closed receiver is then advanced to the next station by swinging the latter about the pivot 10$^a$ by means of the handle 10$^b$.

At the second station, terminals 18 and 19 of a high frequency electric current are placed in engagement, respectively, with the closure elements 13—16 (see Fig. 2), and these closures will serve as electrodes, and the portion of the receiver 12 which is occupied by the material 15 becomes an electrostatic field. High frequency current is supplied from any suitable source, diagrammatically illustrated at 20, and as the charge of material is directly in the electrostatic field, and is acted upon by the high frequency current, molecular friction will be set up in the material, which latter is not a conductor of the current, and this friction gives rise to heat sufficient to cause the material to become uniformly plasticized throughout its mass, within a relatively short period of time. During the heating process the material generates gases, and it may also expand, thus requiring that the closures 13 and 16 be able to withstand considerable pressure without displacement.

After the material has become thus heated to the desired degree of plasticity, the support 10 is given a step of advancement to carry the thus heated material to the next station (see Fig. 3), where the receiver 12 will be in a position that the electric terminals 18—19 may be broken. That is, the terminals will not be in a position to interfere with the other steps in the operation of the method.

At this last station (Fig. 3), there may be provided a plunger 21 for receiving a container 22, which latter may be formed of any suitable pliant material and is preferably closed at its bottom, as at 23. The plunger 21 operates to position the open end of the container with respect to the receiver 12; that is, the open end of the container projects into a recess 24 at the bottom of the receiver to form a tight joint.

Another suitably operated plunger 25 is actuated and enters the top of the receiver 12 to engage the top closure element 16, and by pressure exerted by the plunger upon this element, it, together with the charge 15 and the closure 13, will be forced into the container 22 until the closure 13 rests upon the bottom 23 of the container 22. If the charge of material 15 is sufficient to substantially fill the container 22, then the closure 16 will be positioned and will be secured in position by friction, adjacent the top of the container. However, several charges may be placed in the container 22, and in that event one charge will be superposed upon the other, and the closure 13 for one charge in the receiver 12 will rest upon the closure 16 for another charge in the container.

The closure 16 may be provided with weakened portions 26 which are adapted to be ruptured when the filled container unit is placed in an injection chamber of a molding machine, and when external pressure is exerted upon the container to collapse it, the pressure thereby created will be transmitted to the material 15 to rupture the said weakened portion of the closure 16, to permit of the ejection of the material from the container 22. Thus, it will be seen that the plunger 25 will press the heated charge, together with the closure elements 13—16, into the container 22 as far as possible, so as to provide space for additional charges of the heated material, if additional charges are required or desired. This will be accomplished without the leakage of gases, given off during the heating steps.

After the material has been thus prepared and placed into the container, both are then ready to be immediately placed into an injection chamber of a molding machine, as an original package, and without further heating of the material.

While the preferred method of carrying my invention into operation has been herein described, it is to be understood that various changes may be made in the steps and sequence of operations of this method, and in the type and construction of machine employed for carrying out the method, within the scope of the claim, and without departing from the spirit of this invention.

What is claimed as new is:

The method of heating and packaging molding material which consists in placing an electric conductor closure element in a non-conductive cylindrical chamber to close the bottom of the chamber, placing a predetermined quantity of molding material in said chamber, applying an electric conductor closure element to close the top of the chamber after the material is in the chamber, applying electrodes to said closure elements and supplying high frequency current to the electrodes to heat the material in said mold, and finally forcing the heated material and the closure elements out of said chamber and into a container.

GEORGE W. WACKER.

REFERENCES CITED

The following references are of record in the file of this patent:

UNITED STATES PATENTS

| Number | Name | Date |
|---|---|---|
| 2,179,261 | Keller | Nov. 7, 1939 |
| 2,272,449 | Wacker | Feb. 10, 1942 |
| 2,287,277 | Ryder | June 23, 1942 |
| 2,296,948 | Pitman | Sept. 29, 1942 |
| 1,762,443 | Krueger | June 10, 1930 |

FOREIGN PATENTS

| Number | Country | Date |
|---|---|---|
| 517,798 | Great Britain | Feb. 8, 1940 |